(12) United States Patent
Bell

(10) Patent No.: US 7,712,759 B2
(45) Date of Patent: May 11, 2010

(54) ADJUSTABLE RESILIENT BICYCLE TRAINING WHEEL ASSEMBLY

(76) Inventor: William Mark Bell, 1152 Highway 31, Romance, AR (US) 72136

( * ) Notice: Subject to any disclaimer, the term of this patent is extended or adjusted under 35 U.S.C. 154(b) by 116 days.

(21) Appl. No.: 12/006,852

(22) Filed: Jan. 7, 2008

(65) Prior Publication Data

US 2008/0164676 A1    Jul. 10, 2008

Related U.S. Application Data

(60) Provisional application No. 60/879,005, filed on Jan. 8, 2007.

(51) Int. Cl.
*B62H 1/12* (2006.01)
(52) U.S. Cl. .................................... 280/293
(58) Field of Classification Search ................. 280/293, 280/301, 288.4
See application file for complete search history.

(56) References Cited

U.S. PATENT DOCUMENTS

| | | | | |
|---|---|---|---|---|
| 563,819 A * | 7/1896 | Timms | ........................ | 280/293 |
| 2,535,283 A * | 12/1950 | Groom | ........................ | 280/293 |
| 4,326,729 A * | 4/1982 | Luckowski et al. | ......... | 280/304 |
| 4,615,535 A | 10/1986 | McMurtrey | | |
| 4,810,100 A | 3/1989 | Shavit | | |
| 5,100,163 A * | 3/1992 | Egley et al. | .................. | 280/293 |
| 5,492,354 A * | 2/1996 | Rainey | ........................ | 280/293 |
| 5,707,069 A * | 1/1998 | Plana | ........................ | 280/293 |
| 6,331,012 B1 * | 12/2001 | Eisenmann et al. | ......... | 280/293 |
| 6,976,693 B2 | 12/2005 | Alder | | |
| 2003/0193165 A1 * | 10/2003 | Yoshida | ....................... | 280/293 |
| 2005/0134019 A1 * | 6/2005 | Plana | ........................ | 280/301 |
| 2005/0200097 A1 * | 9/2005 | Alder | ........................ | 280/293 |
| 2006/0043780 A1 * | 3/2006 | Pickering et al. | ............. | 301/9.1 |

* cited by examiner

*Primary Examiner*—Lesley Morris
*Assistant Examiner*—Wesley Potter
(74) *Attorney, Agent, or Firm*—Stephen D. Carver

(57) ABSTRACT

A training wheel assembly for standard bicycles comprises training wheels connected by resilient legs to a dynamic compression fitting. The wheels project generally rearwardly and outwardly apart from the bicycle rear. Adjustable mounting brackets enable wheel height to be varied. The dynamic compression fitting comprises an adjustable flange section mounted to the bicycle frame within the standard trapezoidal void to the rear of the crank sleeve. A pair of yoke segments can be slidably adjusted to accommodate varying dimensions. An intermediate flexing section resiliently coupled beneath the flange section receives ends of the legs and establishes an up and down pivot. A damper section connected beneath the intermediate section comprises a rigid, tubular sleeve that slidably receives a tubular cap. A resilient grommet coaxially confined between the sleeve and the cap is compressed by an elongated through bolt coaxially penetrating the compression fitting. The bolt establishes a radial pivot.

20 Claims, 16 Drawing Sheets

ADJUSTABLE RESILIENT BICYCLE TRAINING WHEEL ASSEMBLY

CROSS REFERENCE TO RELATED APPLICATION

This application is based upon a prior pending U.S. Provisional patent application entitled Bicycle Training Wheels, Ser. No. 60/879,005, Filed Jan. 8, 2007, by inventor William Mark Bell, and priority is claimed.

BACKGROUND OF THE INVENTION

I. Field of the Invention

The present invention relates generally to bicycle training wheels that are suitable for training young children. More particularly, the present invention relates to bicycle training wheel assemblies that mount beneath the bicycle frame and provide flexible auxiliary side wheels that balance the bike, react to shocks, and flexibly compensate for various bicycle positions during use.

II. Description of the Prior Art

Most children learn to ride bicycles with the assistance of outboard training wheels whose basic purpose is to stabilize the bicycle and prevent tipping. Most training wheel assemblies comprise a pair of spaced apart wheels disposed at the end of frame tubes that project downwardly and rearwardly from the bicycle frame on either side. The training wheels are usually smaller in diameter than the bicycle wheels. In use the training wheels may oscillate between positions above the ground and lower positions in ground contact. A variety of diverse frame and attachment means are known in the art. Some designs, for example, attach the training wheel frame to the bike's rear wheel axle. Some designs attach to other portions of the bike's rigid frame.

In my opinion known prior art devices do not perform safely. Many known devices that are not well built and properly designed, are unsafe. They do not stay in proper adjustment, they break easily, and bend or become deformed, even with relatively minor shocks or slight misuse. Many prior art training wheel devices are difficult to install, adjust and service. Many prior art devices use a spring to mount their frame tubes, which often causes excessive bouncing, which contributes to the loss of control.

U.S. Pat. No. 4,615,535 issued Oct. 7, 1986 with a bracket adjustably mounting a training wheel, and an upper portion with multiple, apertures for receiving the rear wheel axle of the bicycle. The configuration is designed to be secured to differently sized and configured rear forks associated with different bicycles.

U.S. Pat. No. 6,976,693 issued Dec. 20, 2005 discloses a bicycle training wheel frame with a stem whose upper end is connected to the bicycle frame, and left and right side tubes, connected to the stem lower end. The left and right side tubes are incapable of separately rotating about the lower end of the stem, but they can pivot about the front end of the stay tubes to place training wheels between the ground and the chain stay tubes.

U.S. Pat. No. 4,810,000 issued Mar. 7, 1989 discloses a bicycle training wheel assembly attachable brackets that support spaced-apart pair of auxiliary wheels. A link is connected between each auxiliary wheel and the bracket and cables operatively attached between the front wheel of the bicycle and the link can move the auxiliary wheels into or out of ground contact There are numerous problems with prior art designs such as those referenced above. Many are difficult to install or align. To be maximally stable, the wheel mounts must be resilient and should be capable of bending or swaying in response to predetermined limited forces dynamically encountered during use. While inherent flexibility of the wheel mounts is desirable to promote stability, such designs may tend to loosen the mounting brackets or hardware used to mount them.

An effective design must be resilient and flexible, and yet it must avoid springs. Each of the training wheels must be displaceable individually, to compensate properly for ground irregularities. In other words, to enhance stability, each training wheel must be capable of diverse movements without shifting the companion training wheel an impermissible degree.

SUMMARY OF THE INVENTION

I have invented a training wheel assembly that reliably stabilizes a bicycle. The various parts are adapted to retrofit to a variety of conventional children's bicycles. In operation the training wheels may resiliently assume a variety of dynamic positions necessary to stabilize the bicycle during typical use and misuse by a child.

The training wheel assembly comprises a pair of spaced apart training wheels connected by resilient legs to a dynamic fitting mounted under the frame of the bicycle. The wheels project generally rearwardly and outwardly, and are positioned apart from the bike's rear wheel, were they are forced against the ground by the legs. Special mounting brackets attach to the legs to enable the wheels to be adjusted by the user.

A dynamic compression fitting controls and mounts training wheel legs. Important pivot points are enabled by my design. The compression fitting comprises an adjustable flange section mounted to the bicycle frame within the standard trapezoidal or triangular void to the rear of the bicycle's pedal crank sleeve defined between the lower frame elements. The flange section has a resilient cover that contacts the bicycle frame tubes beneath an adjustable two piece yoke having opposed, L-shaped segments. Preferably the yoke segments can be slidably adjusted towards or away from each other to mount bikes of varying dimensions.

The compression fitting has an intermediate flexing section beneath the flange section forming generally squarish sockets that receive the mounting ends of the training wheel legs. Resilient means are provided between the intermediate section and the upper flange section to allow compensating movements of the training wheels and the legs supporting them.

A damper section connected beneath the intermediate section of the compression fitting provides additional shock resistance. The damper section comprises a rigid, tubular sleeve attached under the intermediate section, that coaxially receives a slidable, tubular cap. A resilient grommet is coaxially confined between the sleeve and the adjustable cap. An elongated through bolt coaxially penetrating all three aligned sections of the compression fitting. The cap is telescopically displaceable relative to the sleeve, and the two are compressed by the through bolt to enable variable damping resistance for controlling the training wheels and their supporting legs.

The improved training wheels of the invention offer numerous advantages over the prior art. A smoother flex system allows the training wheels to ease the bike into control. The instant device eliminates many stability problems that prior art systems have, and it promotes longer usage for those who have undeveloped skills or disabilities. The preferred device is easy to adjust for smooth surfaces preferred by beginners. As a result, parents feel comfortable with the training wheels while their child is learning to ride. With the device young riders may operate their bikes with more accuracy and safety, so parents become less insecure about their child's use of the bike. Once this device is installed on a bike it may alleviate the fear children may have of toppling over. A child that is more relaxed when training and not in a state of fear will follow the parents riding instructions with more clarity. In this manner the training experience becomes fun for the parent and the child. For example, if the weight decreases at a certain point in a toppling event, the training wheels shift appropriately to offset imbalance.

In most rural areas there are not many smooth surfaces for riding. The present device can be adjusted to accommodate the rider on different surfaces. The device also adjusts for different rider ages, sizes and weights. No special tools required. The device allows parents to install larger diameter wheels for the children or themselves, that create more stability. This feature works well for all those who have awkward skills or balancing problems.

The device includes means for adjusting the training the wheels forwardly or rearwardly to adapt for differently sized bikes. The larger wheels allow the bikes to handle speed and they are much better built with a stronger design. Some larger wheels can be used with my device because they can handle the different speeds and weights. In some devices they require a lot of assembly time, tools, they are too rigid, or they cause a reaction if they are over corrected that may cause the bike to go out of control worse. The training wheels that have a spring device may cause an over reaction.

Thus a basic object is to provide flexible and dexterous training wheels that aid stability and control, especially for young children.

A related object is to facilitate smooth effortless operation, by decreasing bouncing, and jarring effects.

Another important object is to provide training wheels of the character described that are easy to assemble, install, adjust, and use.

Another basic object is to provide training wheels of the character described with parts that are waterproof and rustproof.

Another important object is to provide training wheels that are virtually maintenance free.

Another object is to provide a stable unit that avoids the use of coil springs.

A further object is to provide training wheels that are easy to package and ship.

Yet another object is to provide a training wheel assembly of the character described that reduces the possibility of injury to the rider's legs and feet A related object is to provide a training wheel system that improves bicycle balance and stability. A feature of the invention is that the wheel supports pivot at the center or directly under the rider, and weight distribution is not concentrated at the rear wheel.

Another object is to increase dexterity by establishing important pivot points. In the best mode there are two primary pivot directions. One pivot point feature allows the wheel legs, and thus the training wheels, to pivot up and down. Another important pivot feature provided by an elongated through bolt allows the training wheels to swing right and left, defining an arc occupying a plane parallel to ground.

Another object of the invention is to provide a training wheel assembly that is stable during hard turns.

Yet another object of the invention is to provide a training wheel assembly whose wheels are able to deflect and compensate as the bicycle leans or tilts as it is steered. A feature enabled by my structural combination is that by leaning the bicycle, a rider is allowed to turn more sharply, thereby avoiding obstacles.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE PREFERRED EMBODIMENT

Figure 1:
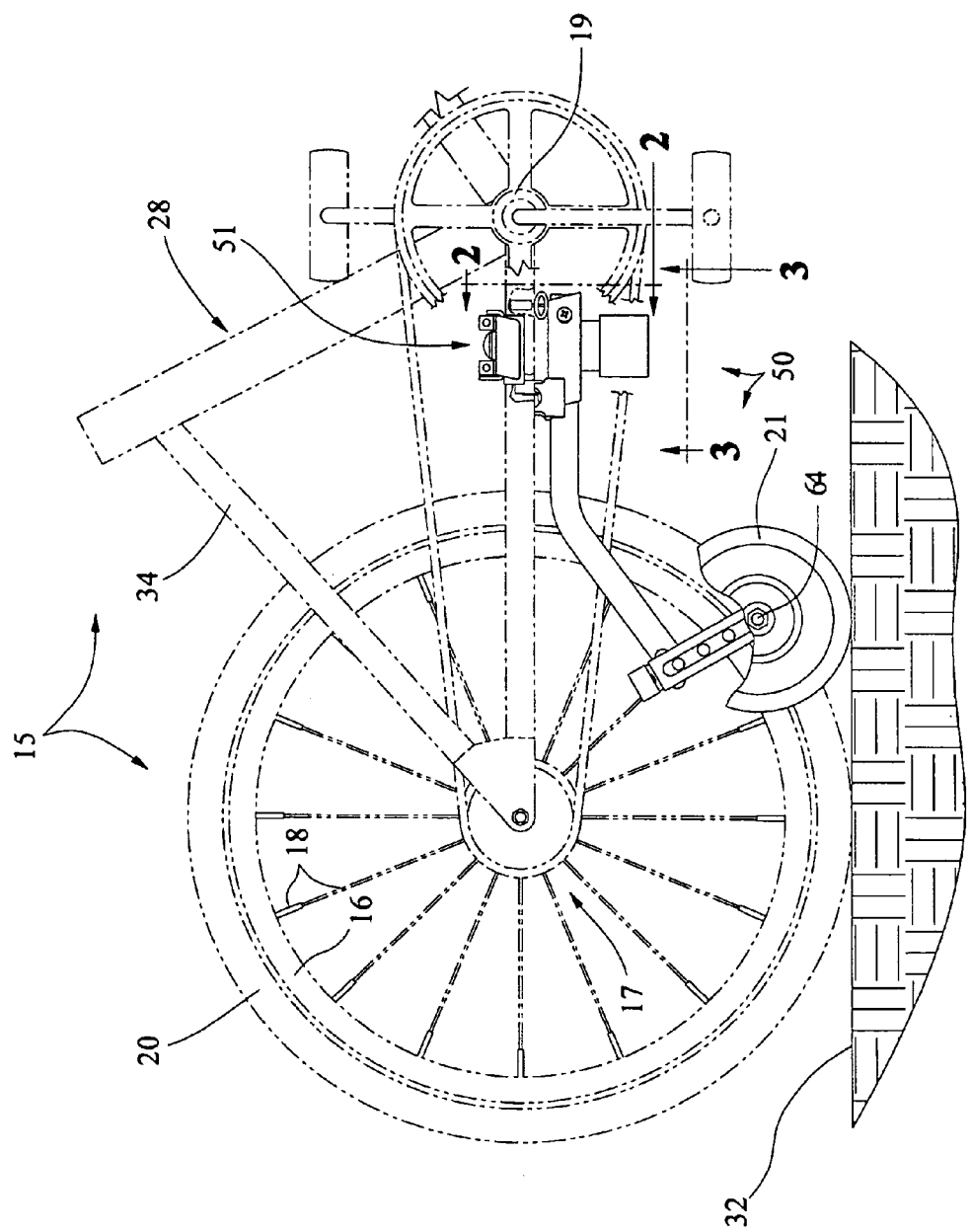
FIG. 1 is a fragmentary side elevational view of the rear of a conventional bicycle with the training wheel assembly installed, with portions broken away or shown in section for clarity.
Figure 2:
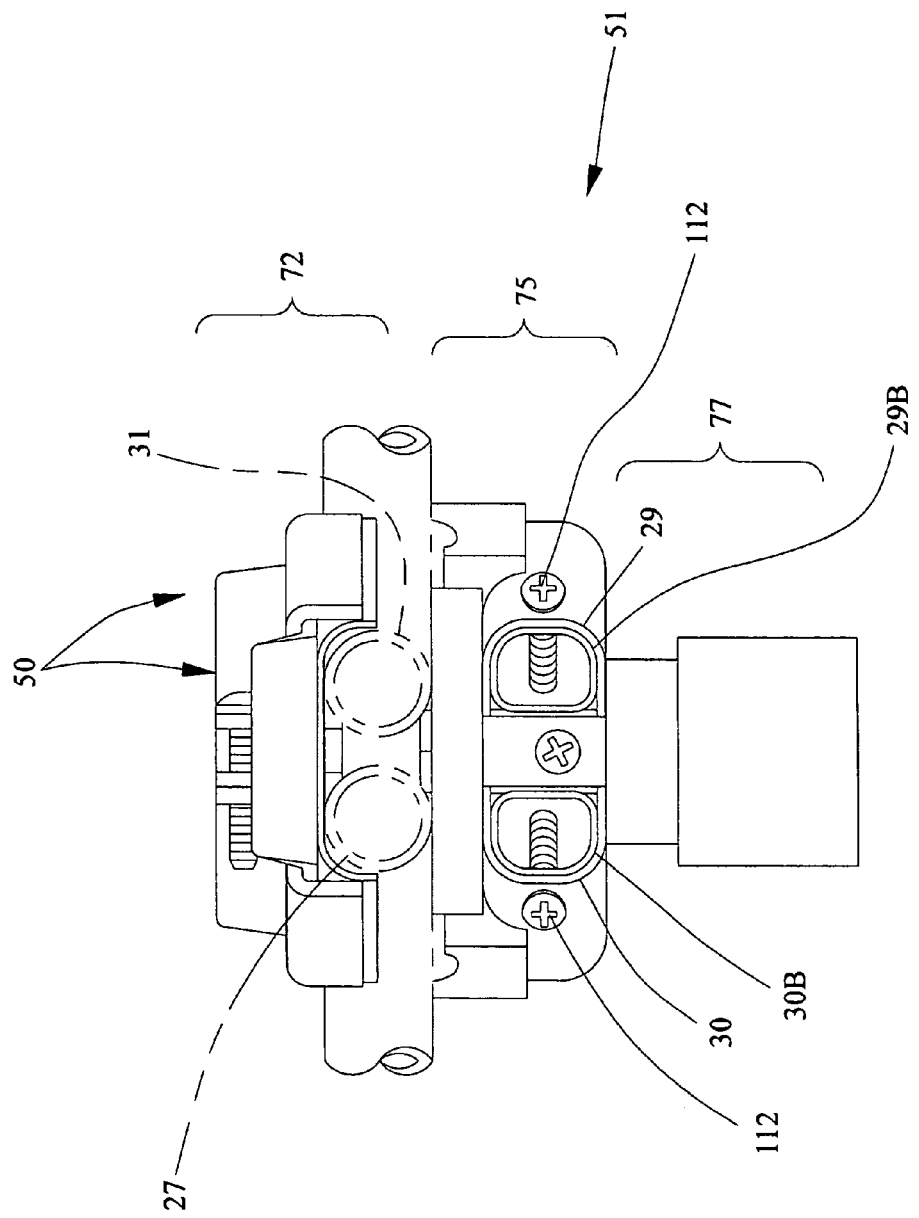
FIG. 2 is an enlarged, fragmentary front elevation view of the bicycle training wheel assembly of FIG. 1 taken generally along lines 2-2.

Initially referring to FIGS. 1-4, 7 and 8, a conventional bicycle upon which the invention is to be deployed and used is designated generally by the reference numeral 15. As only the rear section of the bicycle 15 is important for the disclosure, front parts of the conventional bicycle 15 have been omitted for brevity. The bicycle rear supports a conventional rear wheel assembly 17 that is to be stabilized by the training wheel assembly discussed hereinafter as the bike rolls over a variety of surfaces, such as the ideal flat surface 32 (FIG. 1).

A conventional rear bicycle wheel 20 is rotatably supported by axle 70 (FIG. 4) that penetrates the rear of both rearwardly extending, horizontally disposed bicycle side frame tubes 27 and 31 (i.e., FIGS. 3, 5) to secure conventional drive sprocket 26. Conventional radially spaced apart spokes 18 extend between wheel rim 16 and the sprocket 26. Bicycle frame tubes 27, 31 extend to a conventional transverse crank sleeve 19 to which they are welded, and they diverge rearwardly in the conventional fashion to form a mounting space between which the wheel assembly 17 is rotatably secured. The rear wheel assembly 17 is mounted by threaded axle 70 compressively secured through conventional terminal flanges 24 by hex nuts 25. Wheel 20 is driven by conventional chain 23, which is entrained about conventional pedal-driven drive sprocket 44 journalled to sleeve 19. Crank arms 35 rotate within sleeve 19 through which the crank is conventionally journalled, and support conventional drive pedals 41 contacted by the driver's feet 37 (FIG. 4). A single diagonally rearwardly extending frame tube 28 extends generally upwardly from crank sleeve 19 and supports a conventional adjustable seat (not shown). Sleeve 19 also supports a forwardly extending diagonal frame tube 33 (FIG. 1) that extends generally upwardly to a conventional steering post (not shown) that mounts conventional handle bars that turn the front wheel through a conventional front fork. A pair of conventional, downwardly angled frame bars 34 (FIG. 1) extend rearwardly at an angle on opposite sides of the wheel 20, terminating in flanges 24 that secure the wheel assembly 17.

Figure 3:
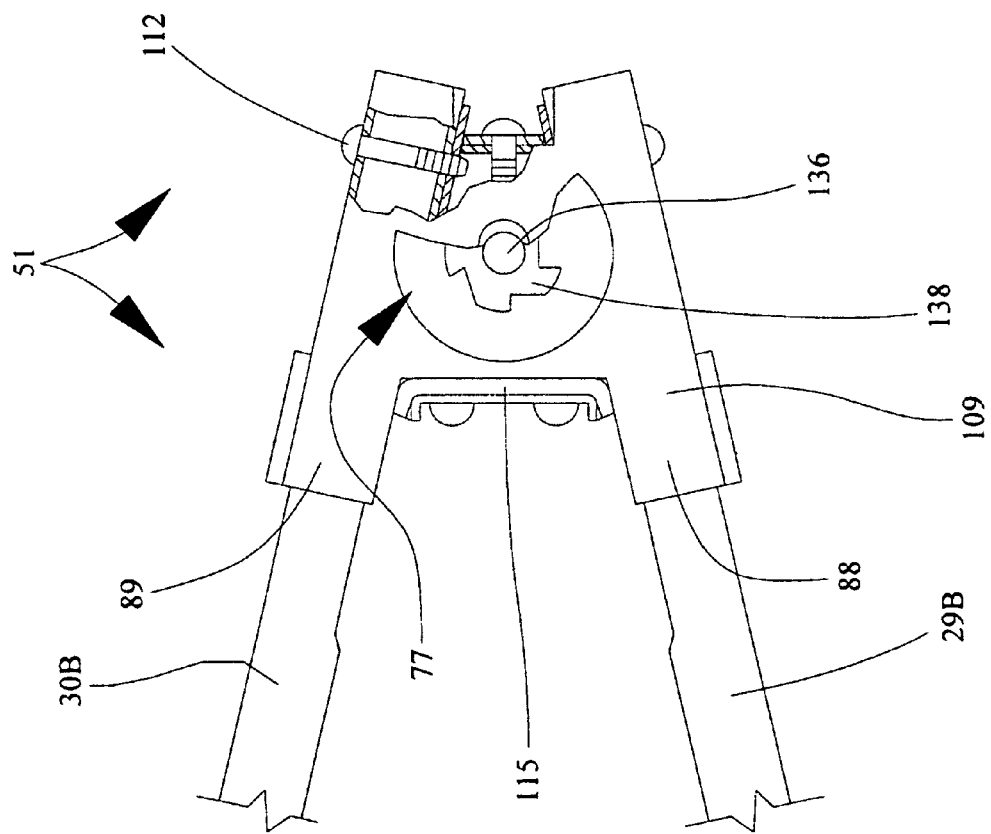
FIG. 3 is an enlarged, fragmentary bottom plan view of mounting assembly of FIG. 1, taken generally from a position indicated by lines 3-3 in FIG. 1.
Figure 4:
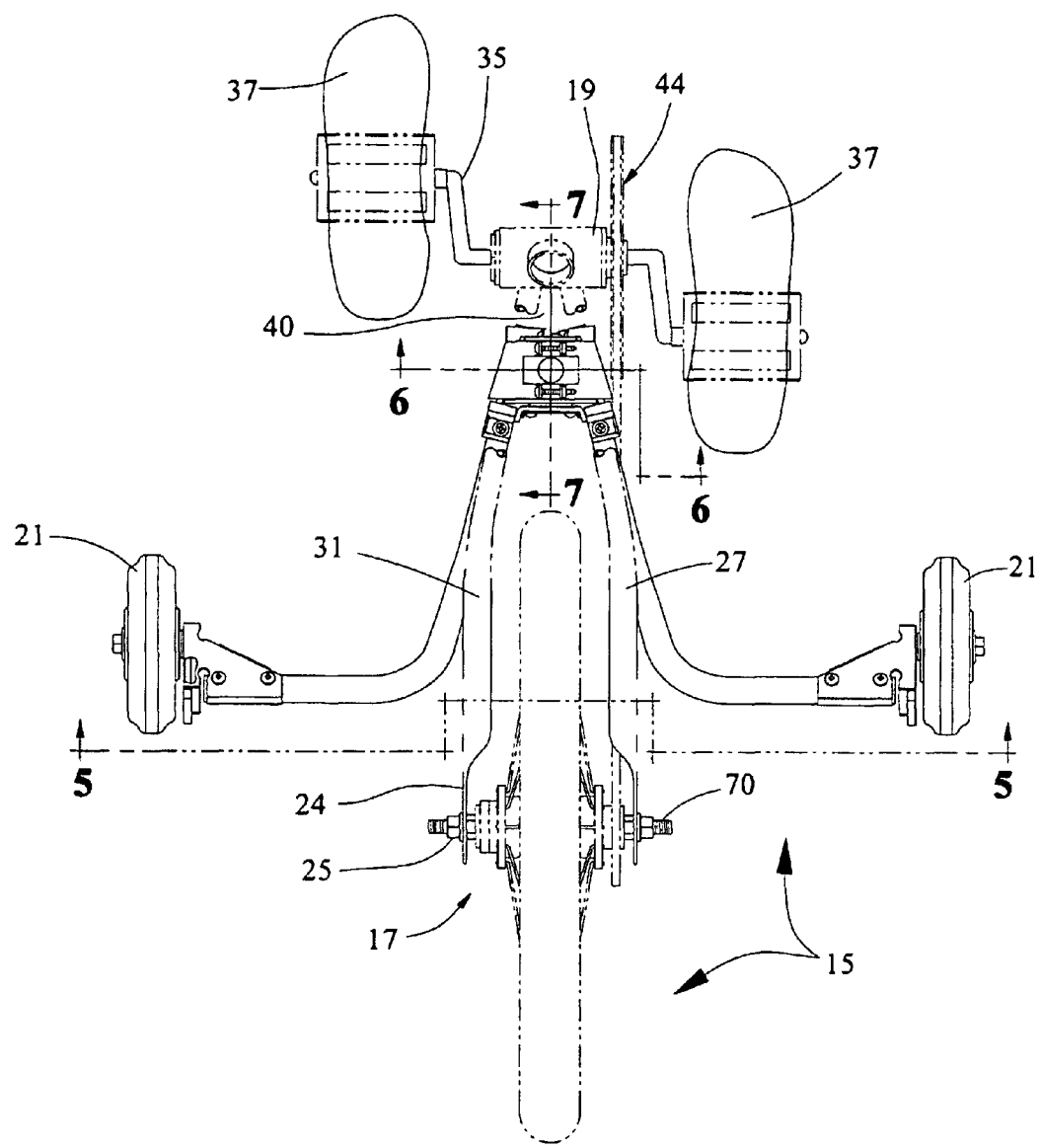
FIG. 4 is a fragmentary top plan view illustrating preferred positioning of the rider's feet.
Figure 5:
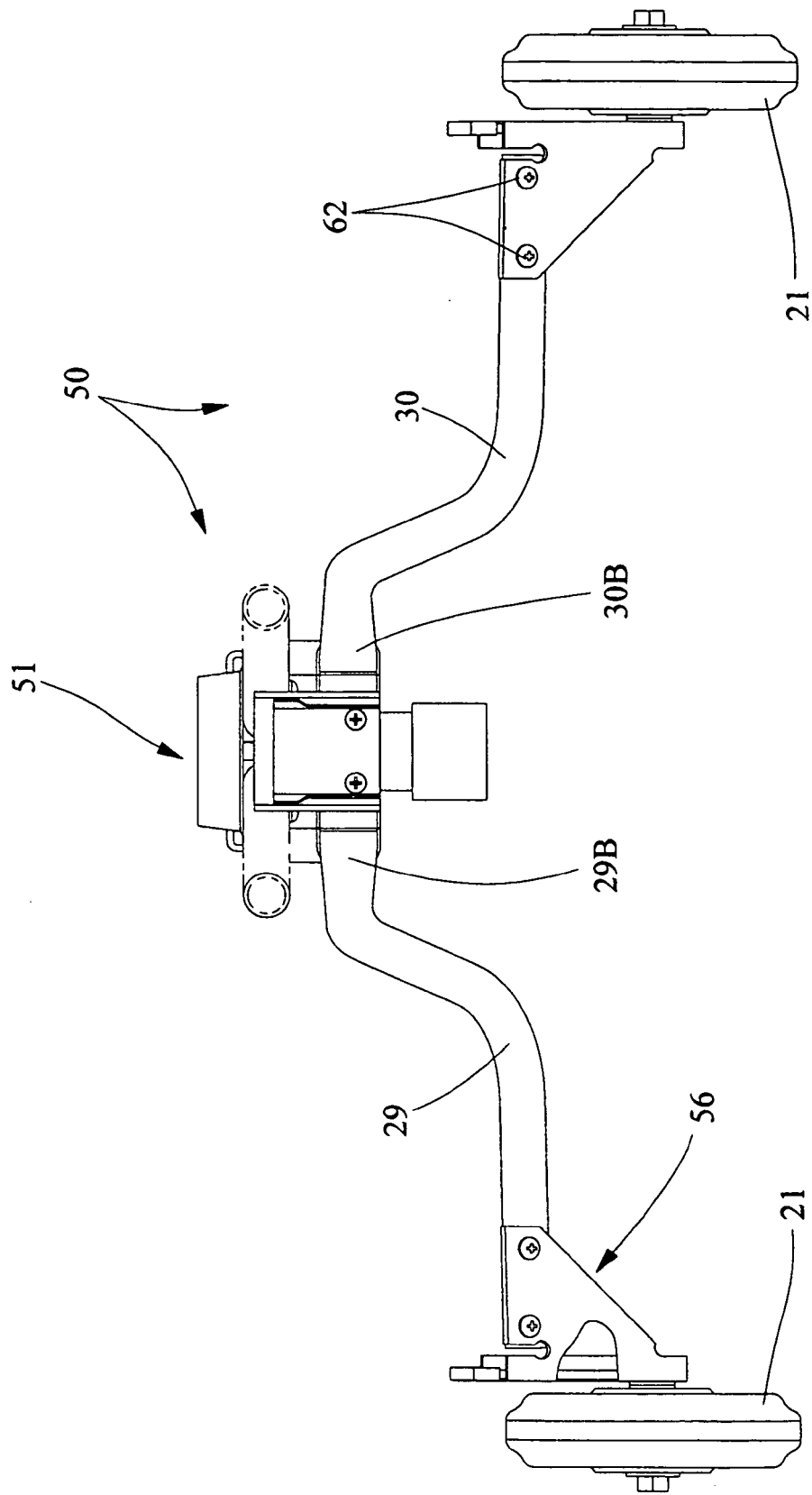
FIG. 5 is a fragmentary rear elevational view taken generally along line 5-5 of FIG. 4, showing the position of back stop and pivot blocks, with respect to the support tubes.

The conventional rear bicycle wheel assembly 17 is stabilized by a pair of spaced apart training wheels 21 (i.e., FIG. 4) that are part of the training wheel mounting assembly, generally designated by the reference numeral 50 (FIGS. 3, 4). The frame side tubes 27 and 31 are welded to crank sleeve 19 and they diverge rearwardly from opposite ends of the sleeve 19 to form a conventional, generally trapezoidal void region 40 (FIG. 4) located immediately to the rear of the sleeve 19 through and upon which the training wheel assembly 50 is compressively mounted.

The training wheel assembly comprises a dynamic compression fitting 51 that controls and mounts the rearwardly extending training wheel legs 29, 30 that enables flexing and promotes stabilizing movements as detailed hereinafter. Compression fitting 51 is preferably mounted within void region 40 (i.e., FIGS. 4, 6). The training wheel support legs 29, 30 are somewhat L-shaped, with their rear portions 29A, 30A projecting generally perpendicularly outwardly away from the plane of the rear bicycle wheel 20 (i.e., FIG. 12). Because of the resilient characteristics of the compression fitting 51 discussed in detail hereinafter, the training wheel support legs 29, 30 can flex to accommodate different terrain and surface irregularities, and their flexure can accommodate sporadic and fluctuating riding styles. The training wheel support legs 29, 30 compensate for diverse weights and stresses and strains during operation. These legs are not welded into place, they are easy to assemble, and disassemble. Preferably the twin legs 29, 30 extend beneath and away from the crank sleeve 19 to position them out of the way, reducing chances of rider injury because of their outward positioning. In other words, it is preferred that the training wheel support legs are not mounted directly underneath the pedals 41 and/or crank sleeve 19. This design prevents the rider's feet 37 from being trapped or caught. The legs 29, 30 are inexpensive in their design, and are easy to package and shelf due to their simple breakdown that allows it to be placed in smaller boxes. The fronts 29B, 30B (FIG. 5) of the training wheel legs 29, 30 are squared somewhat, so that, once installed and connected to compression fitting 51, they are prevented from twisting.

Each training wheel leg 29, 30, terminates at its outermost rear ends 29A, 30A respectively in a reversible training wheel bracket 56. As best seen in FIGS. 16-19, each bracket 56 comprises a rigid, generally triangular body 58 comprising a base 59 that is integral with an elongated in-turned flange 60 that is bent perpendicularly relative to body 58. There is a pair of suitable orifices defined in base 59 for receiving fasteners 62 that connect the brackets 56 to the ends 29A or 30A of the training wheel legs 29 or 30. As appreciated from a comparison of FIGS. 16 and 18, the brackets 56 can be mounted with body 58 projecting downwardly or upwardly to accommodate different training wheel heights. Additionally, an elongated slot 63 (i.e., FIGS. 17, 19) is defined in edge flange 60 of each bracket 56. Slot 63 receives the axle 64 projecting from the training wheel center (FIG. 1), to secure the training wheels. The slot enables variable positioning, allowing the training wheels to be slidably positioned as desired within the slot at a desired height. The training wheel support legs can thus be used with bicycles having different diameter wheels. Thus the training wheel orientation can be switched for use between adult bikes and smaller children's bikes. It will also be apparent that, as a child gains more confidence as he or she learns to ride, the training wheels can be gradually moved up and away from the riding surface.

The compression fitting 51 which mounts the training wheel assembly 50 is best illustrated in FIGS. 2, 3, 6, and 9. As explained earlier, the compression fitting 51 is secured over trapezoidal void region 40 (FIGS. 4 and 6) that is behind the crank sleeve 19 and between the bike's horizontal frame tubes 27, 31. Fitting 51 resiliently and flexibly supports the training wheel support legs 29 and 30 that project rearwardly and hold the training wheels. Training wheel legs 29 and 30 are enabled to shift laterally, and to pivot right or left, and up and down. The training wheels can thus stably support the bike while it is driven over jagged or irregular terrain.

The dynamic compression fitting 51 (FIG. 6) preferably comprises three main sections. The adjustable mounting flange section 72 is secured over void region 40 over bicycle horizontal frame tubes 27 and 31 and supports the two lower sections of compression fitting 51. An intermediate flexing section 75 secured to and disposed immediately beneath flange section 72 mounts the two bicycle training wheel legs 29 and 30 referenced earlier. The lowermost portion of compression fitting 51 is a generally tubular damper section 77 that is mated to flexing section 75. Because of the many dynamic positions assumed, sections 75 and 77 add flexibility and resilience to the training wheel legs. Sections 72, 75 and 77 are axially compressed together over the bicycle frame tubes 27, 31 by an elongated, through bolt 79 that extends generally vertically through the center of the dynamic compression fitting 51, coaxially through damper section 77.

Figure 6:
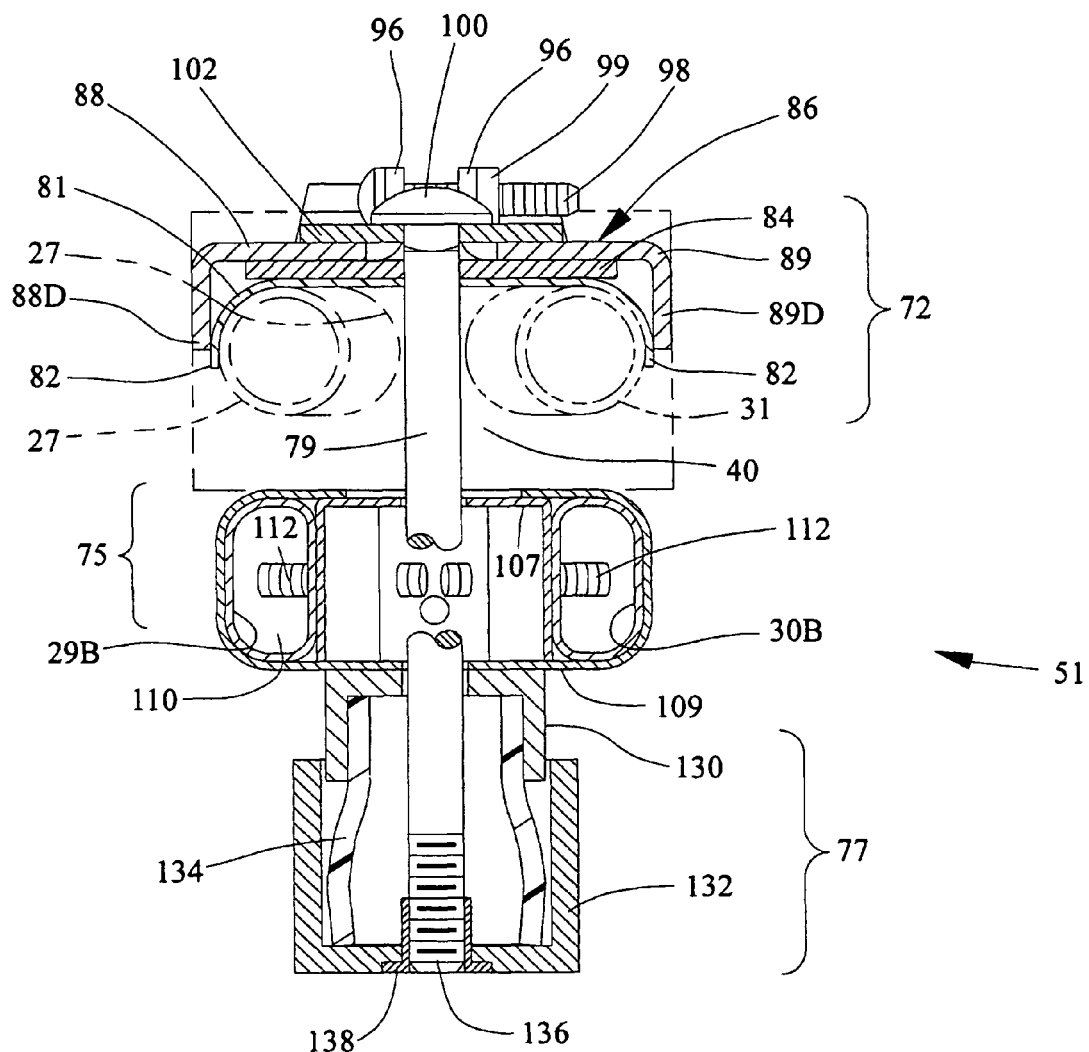
FIG. 6 is an enlarged, fragmentary sectional view taken generally along line 6-6 of FIG. 4, showing the dynamic compression fitting mounted upon the bicycle frame, with portions thereof omitted for clarity.
Figure 7:
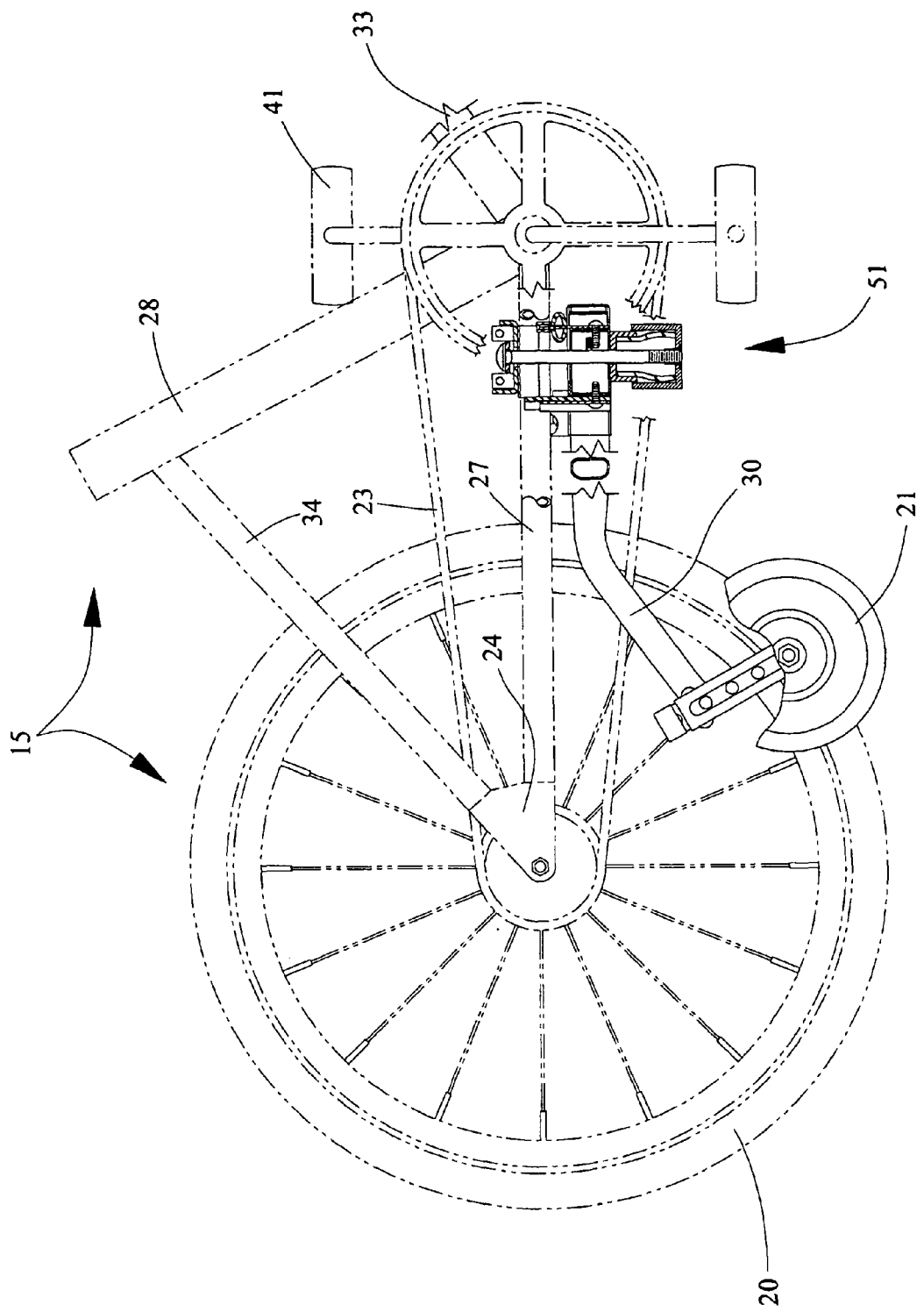
FIG. 7 is a fragmentary side elevational view of a typical bike showing the training wheels, with portions of the mounting and dampening apparatus shown in section to illustrate how they appear on level ground.

The adjustable top flange section 72 has several components sandwiched together. A trough shaped, resilient cover 81 extends across the tops of and contacts the frame tubes 27 and 31. The internal cover 81 has outermost curved edges 82 (FIG. 6) that embrace the outer circumference of both frame tubes 27, 31 and spans the region atop them. Cover 81 pressed into engagement with tubes 27 and 31 by a flat plate 84. An adjustable two piece yoke 86 is disposed over plate 84. Yoke 86 comprises a pair of downwardly turned, generally L-shaped segments 88 and 89 whose downwardly projecting lips 88D and 89D respectively that contact the curved edges 82 of resilient cover 81 overlying opposite sides of the frame tubes 27 and 31 (FIG. 6). Yoke 86 is adjustable. Yoke segments 88 and 89 can slide towards or away from each other to custom fit and adjustably grasp the frame tubes 27 and 31 beneath them. By comparing FIGS. 6 and 9, for example, it is seen that each yoke segment 88, 89 has a pair of spaced-apart apertured tab 96. Adjustable bolts 98 secured by nuts 99 (i.e., FIG. 6) extend through aligned orifices 97 in opposed tabs 96 to tighten or loosen yoke segments 88, 89. The head 100 of through bolt 79 is disposed between opposed pairs of tabs 96 over a resilient washer 102 (FIG. 6)

The intermediate flexing section 75 of dynamic compression fitting 51 comprises an inner rigid channel 107 penetrated by through bolt 79. A larger, outermost shroud 109 substantially surrounds channel 107, forming generally squarish sockets 110 between the outer sides of the channel 107. The squarish ends 29B and 30B (FIG. 6) of the training wheel support legs 29, 30 are received within sockets 110, and secured in assembly by leg bolts 112 (FIG. 6). Alternatively the legs could be welded to flexing section 75, as with original equipment designs.

Figure 9:
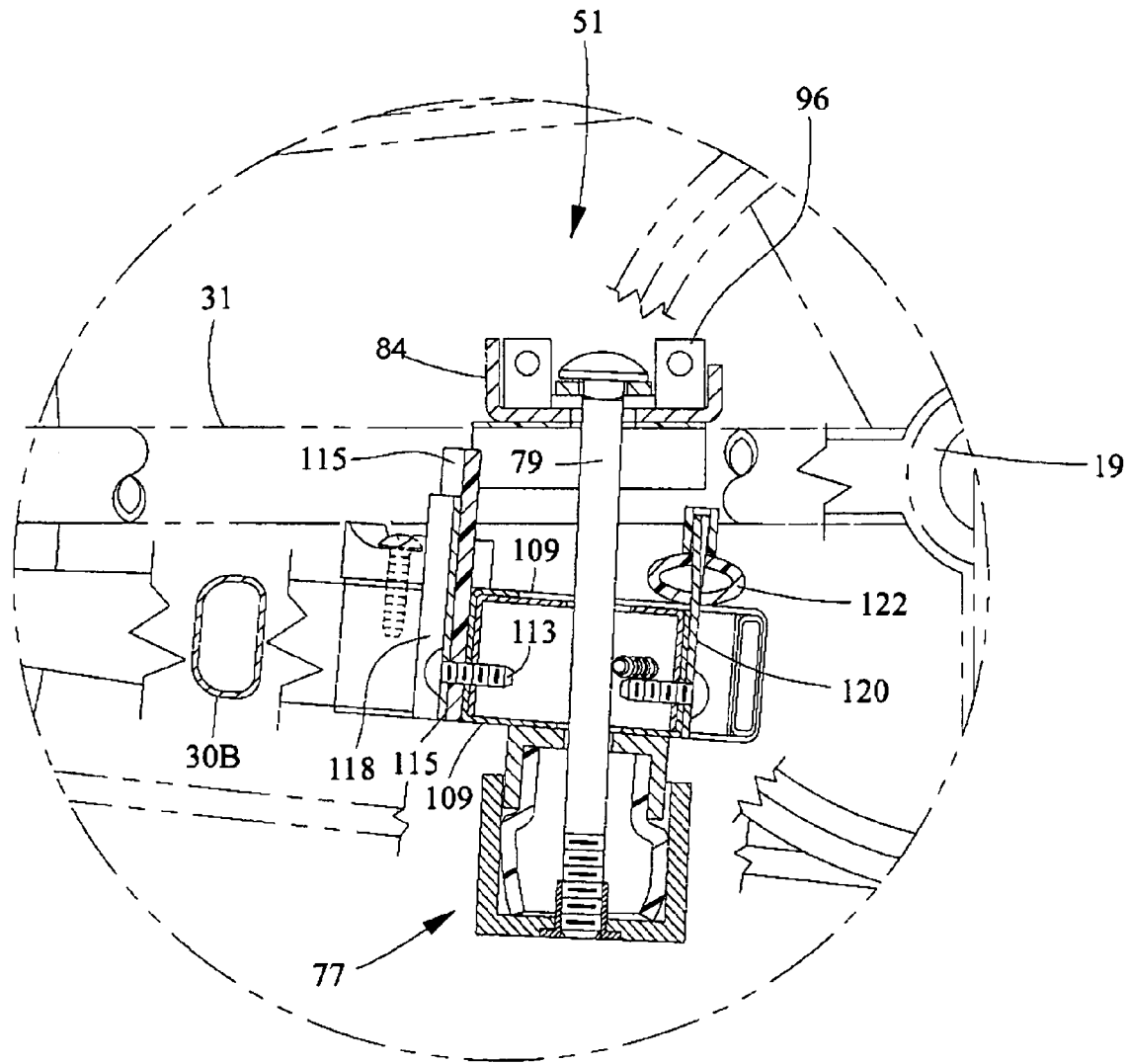
FIG. 9 is an enlarged fragmentary sectional view of circled region 9 of FIG. 8.
Figure 11:
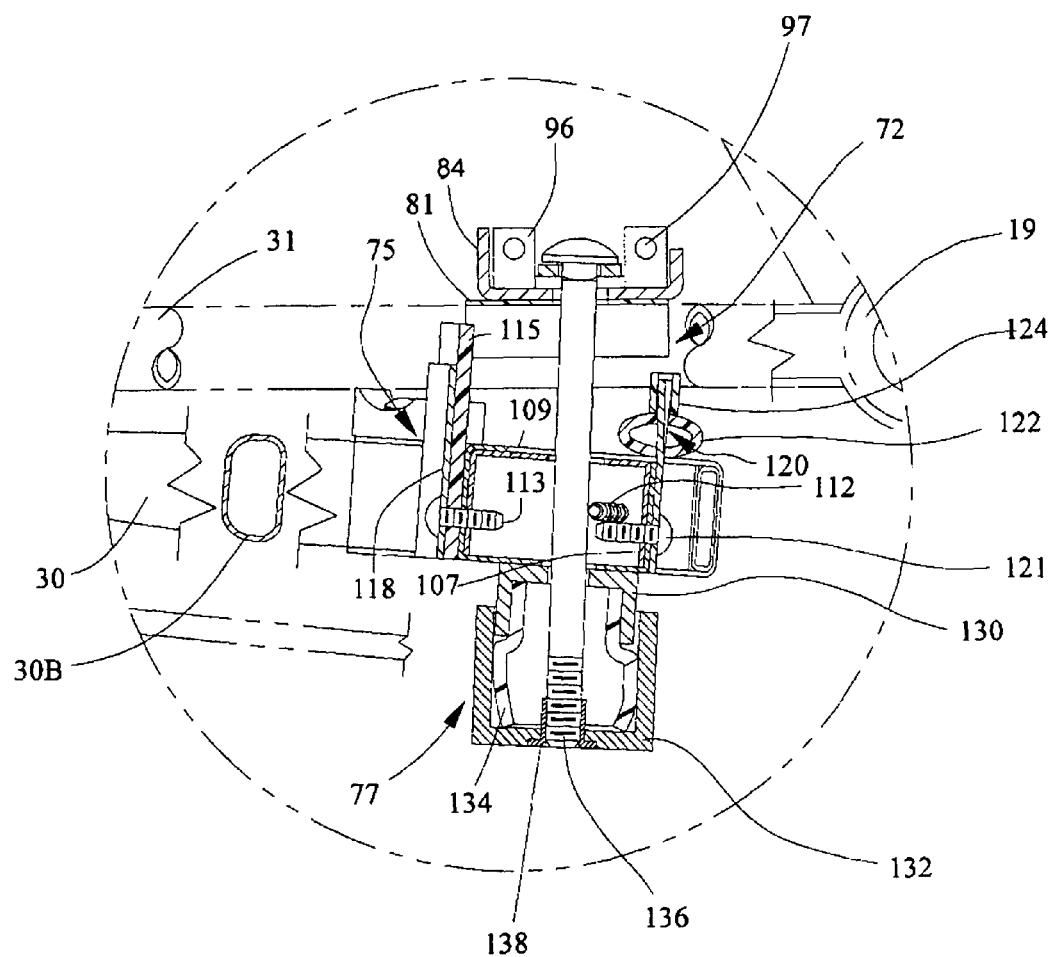
FIG. 11 is an enlarged fragmentary sectional view of circled region 11 of FIG. 10.

The dynamic compression fitting 51 flexibly connects to its intermediate training wheel leg flexing section 75 to provide added flexibility to the training wheel legs 29, 30. As best seen in FIGS. 9 and 11, the outer shroud 109 of section 75 is fastened via bolt 113 at its rear to a resilient wall 115 that is sandwiched against shroud 109 by backing 118 (FIG. 9). Wall 115 is secured by bolts 113 (FIGS. 3, 11) and it extends into the flange section 72 above it, abutting vertex of shroud 109, as seen from the bottom in FIG. 3. The front of section 75 is also resiliently connected via an upwardly extending side wall 120 secured by bolt 121 that penetrates the edge of a resilient flex tube 122 (FIG. 11). The top edge of wall 120 seats within a resilient channel portion 124 of the resilient flex tube 122. Wall 115 allows flexing of intermediate section 75 relative to upper flange section 72 so the training wheels and their support legs can pivot upwardly or downwardly. This first major pivot point is important. Flexing travel is limited by the dimensions of the compressible resilient tube 122 which seats within upper flange section 72.

The lowermost damper section 77 provides additional shock absorbing and compensation for the training wheels. A rigid, tubular sleeve 130 (FIGS. 6, 11) is fixed beneath intermediate section 75, being coaxially penetrated by through bolt 79. A larger-diameter tubular cap 132 is coaxially centered beneath and around sleeve 130, and it is telescopically displaceable relative to sleeve 130. A tubular, resilient grommet 134 is compressively captivated between sleeve 130 and cap 132. Through bolt 79 can be tightened as desired to produce the desired stiffness. Bolt 79 extending coaxially through sleeve 130 and cap 132 has an end 136 threadably received by threaded seat 138 that is press fitted into the bottom of cap 132 (FIGS. 3, 6, 11). When bolt 79 is tightened, cap 132 is axially displaced, i.e., squeezed upwardly, causing the grommet 134 to flare and compress against and within sleeve 130.

Grommet 134 in damper section 77 thus acts as a shock absorber. This grommet arrangement is preferred over conventional coil spring designs. Tensioning adjustments to through bolt 79 facilitate different tensions on the training wheel legs for different rider sizes and weights, and this arrangement lets the rider comfortably traverse a variety of terrains. When severely compressed grommet 134 effectively keeps the bike from teetering, which gives the beginner rider more confidence and less fear about the bike toppling over. As the rider matures in skill, bolt 79 can be loosened to decrease the supporting effects of the training wheels. Bolt 79 establishes a second important pivot point; it allows the training wheels legs and the wheels supported thereby to rotate in an arc occupying a plane that is generally parallel with the ground or supporting surface below.

Figure 12:
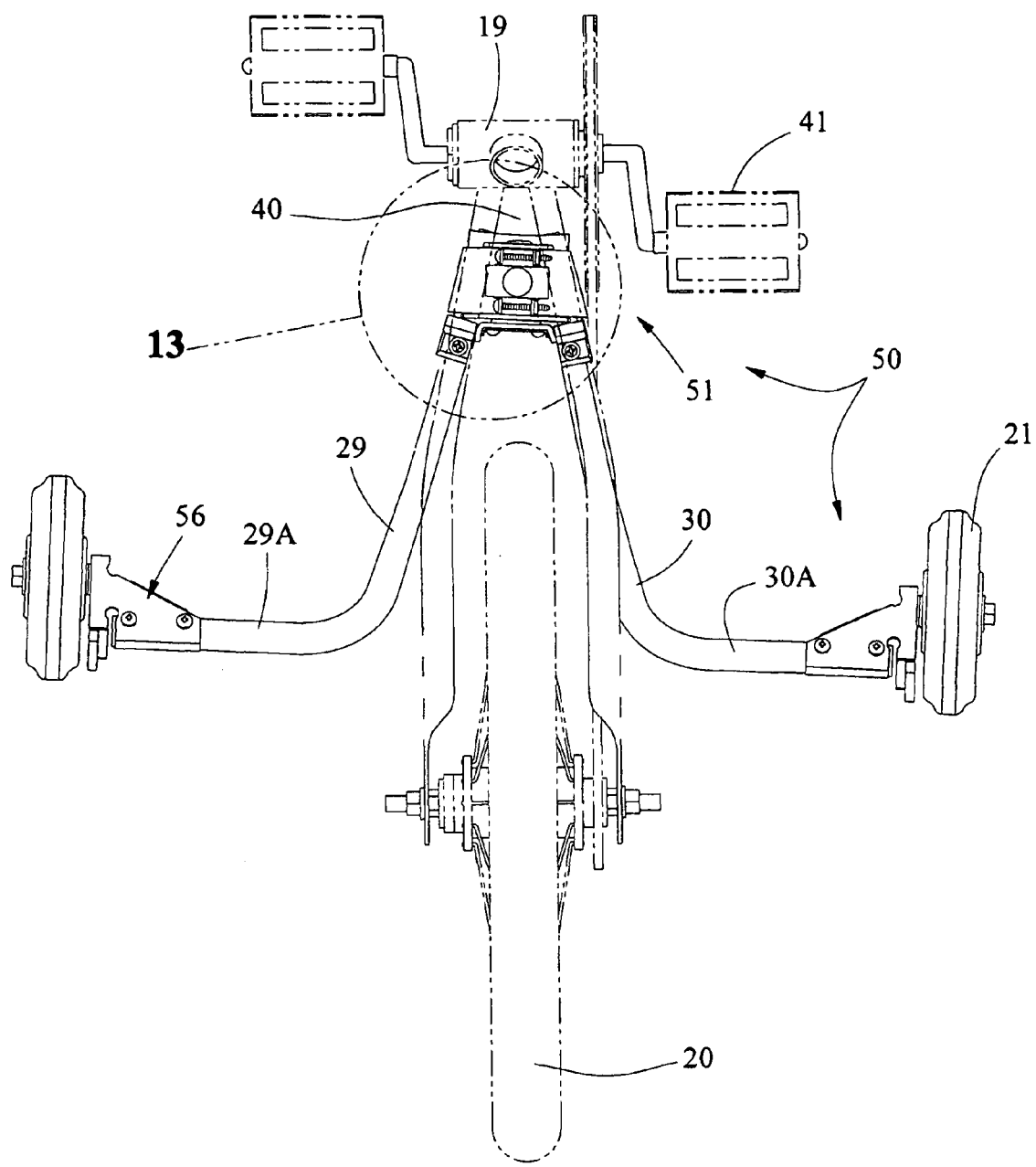
FIG. 12 is a fragmentary top plan view showing the bike in a turn to the right and the reaction of the training wheels.
Figure 13:
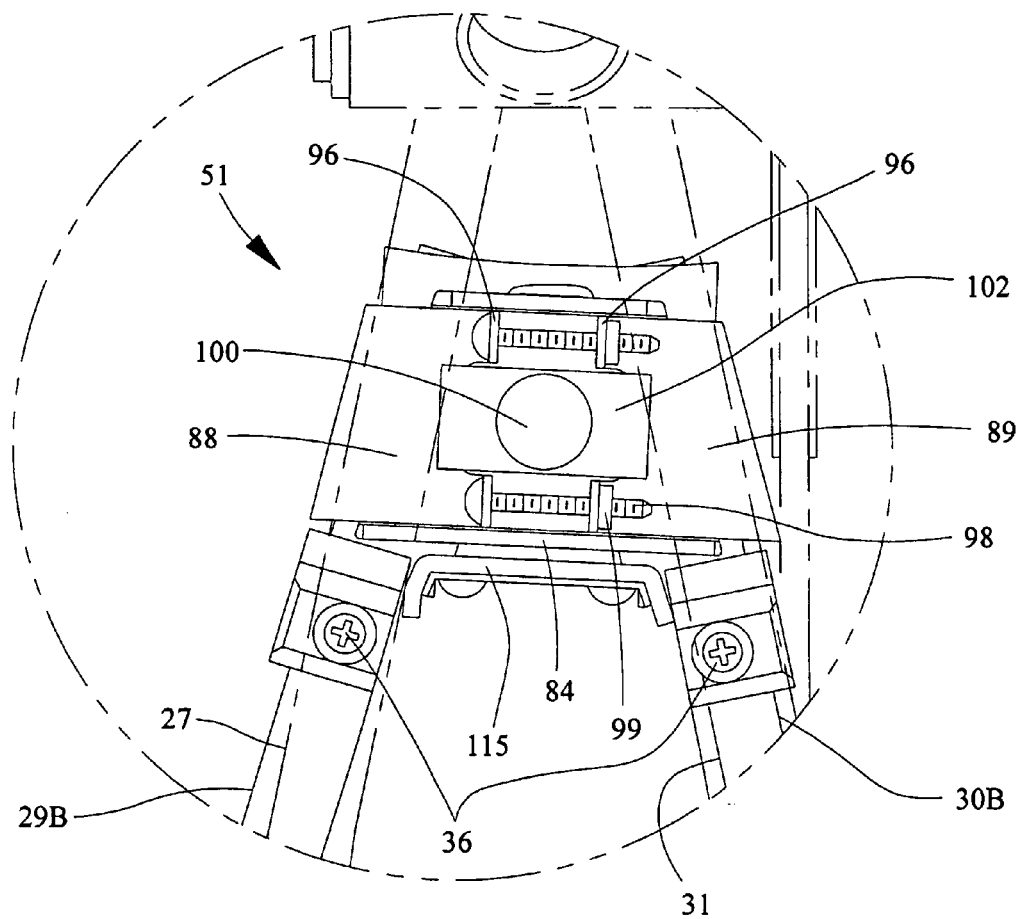
FIG. 13 is an enlarged, fragmentary top plan view of circled region 13 of FIG. 12.
Figure 14:
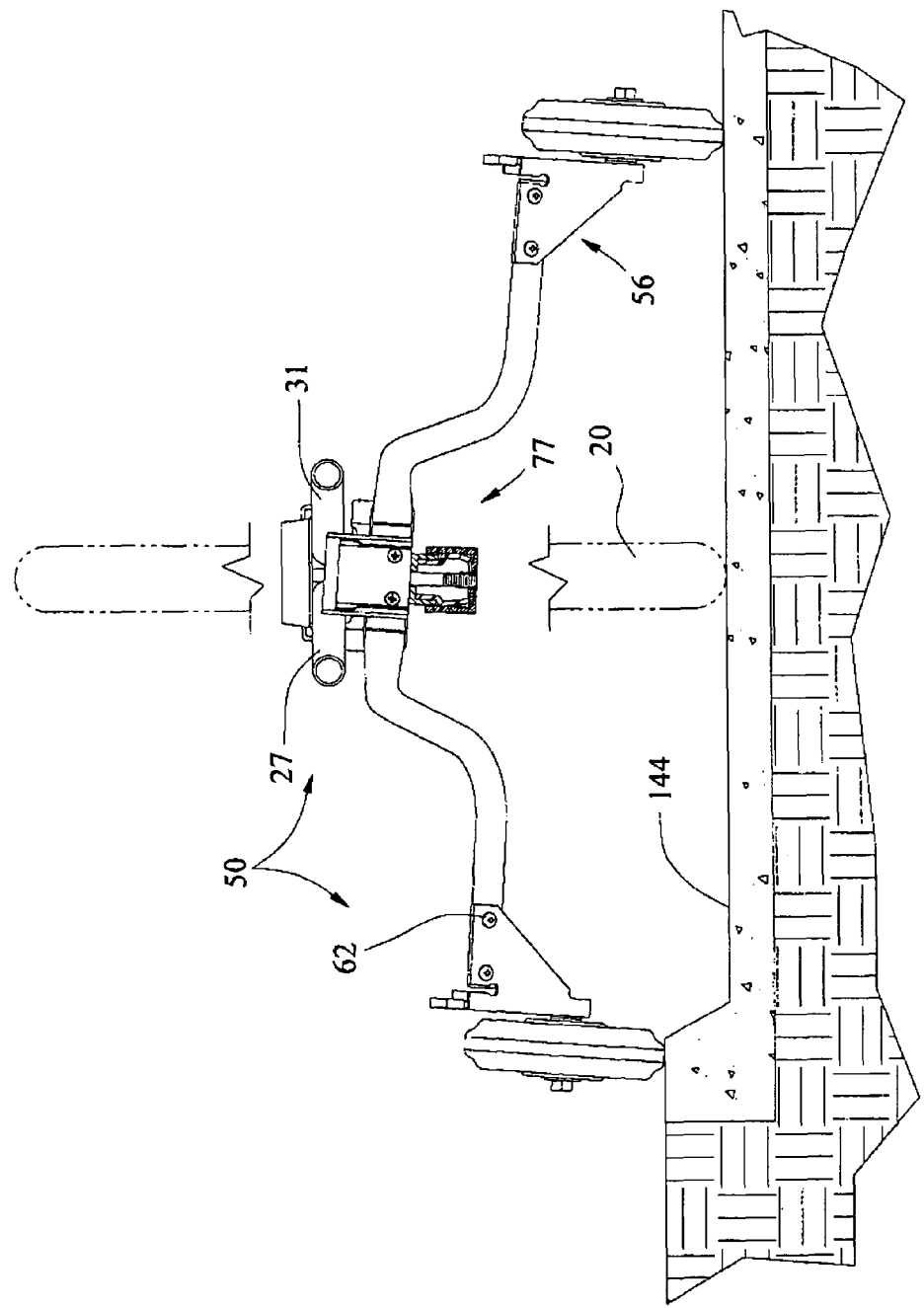
FIG. 14 is a fragmentary rear end elevation view showing one training wheel riding upon a curb with various parts shown in section to reveal key internal part movements.

Operation:

Given the foregoing construction, the rider will not contact wheel supporting legs 29, or 30, even when turning as in FIG. 12. If a child's foot should slip off either pedal 41 during a ride, it would be difficult for the foot to get caught under the training wheel supporting legs, because they stay close to the bike frame and only diverge at the rear of the bike. From FIG. 12 it is noted that training wheel leg 30 has deflected inwardly towards wheel 20 during a turn towards the left. The front wheel and the handle bars are repositioning. The training wheel legs allow shifting of the training wheels to the right or left depending upon conditions. This allows the rider to turn the bike with more accuracy; providing the rider with a "feeling" of how the bike should operate.

Figure 8:
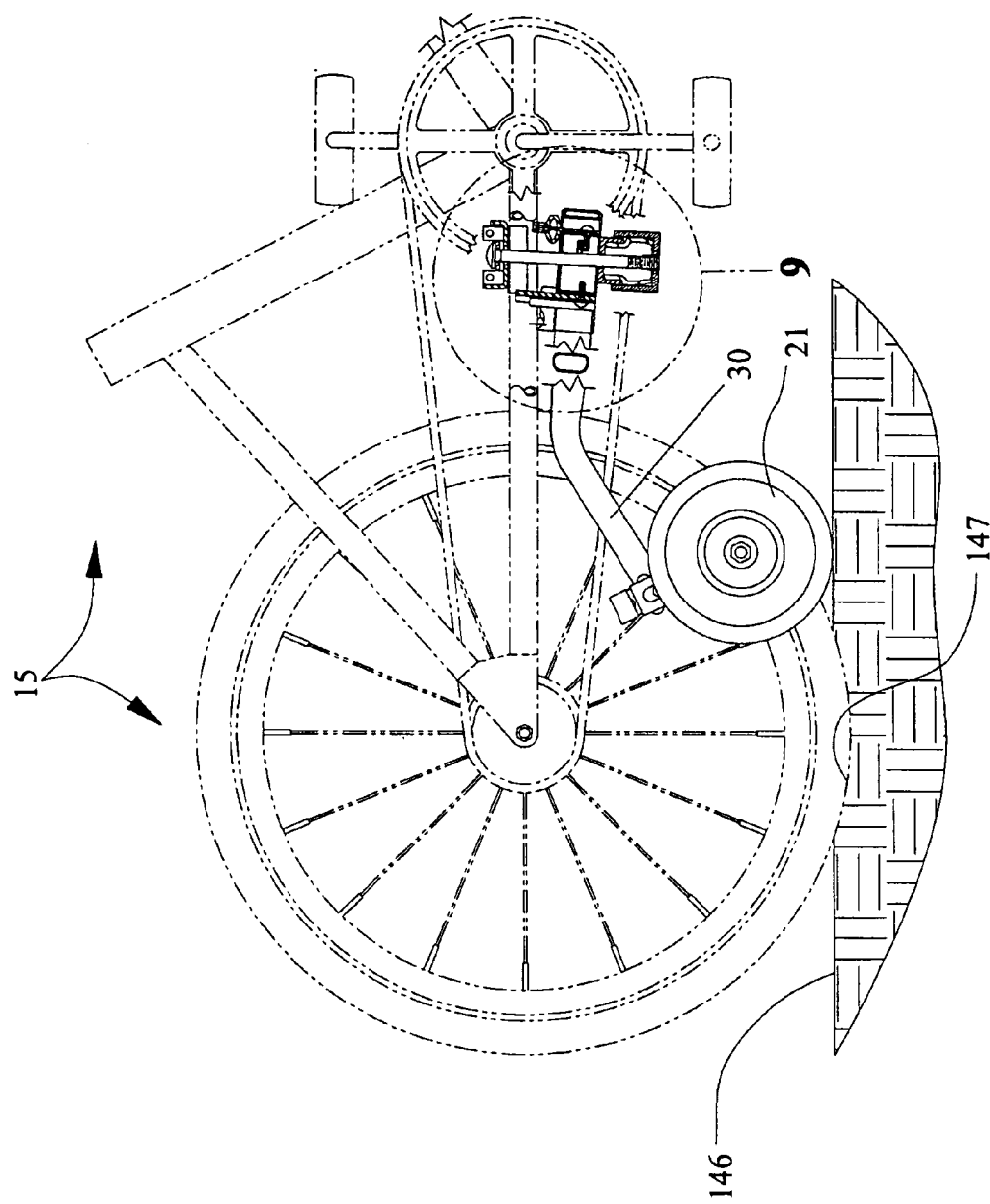
FIG. 8 is a fragmentary side elevational view similar to FIG. 7, showing the mounting and dampening apparatus in section to illustrate how they appear when the rear bicycle wheel encounters a pothole.
Figure 10:
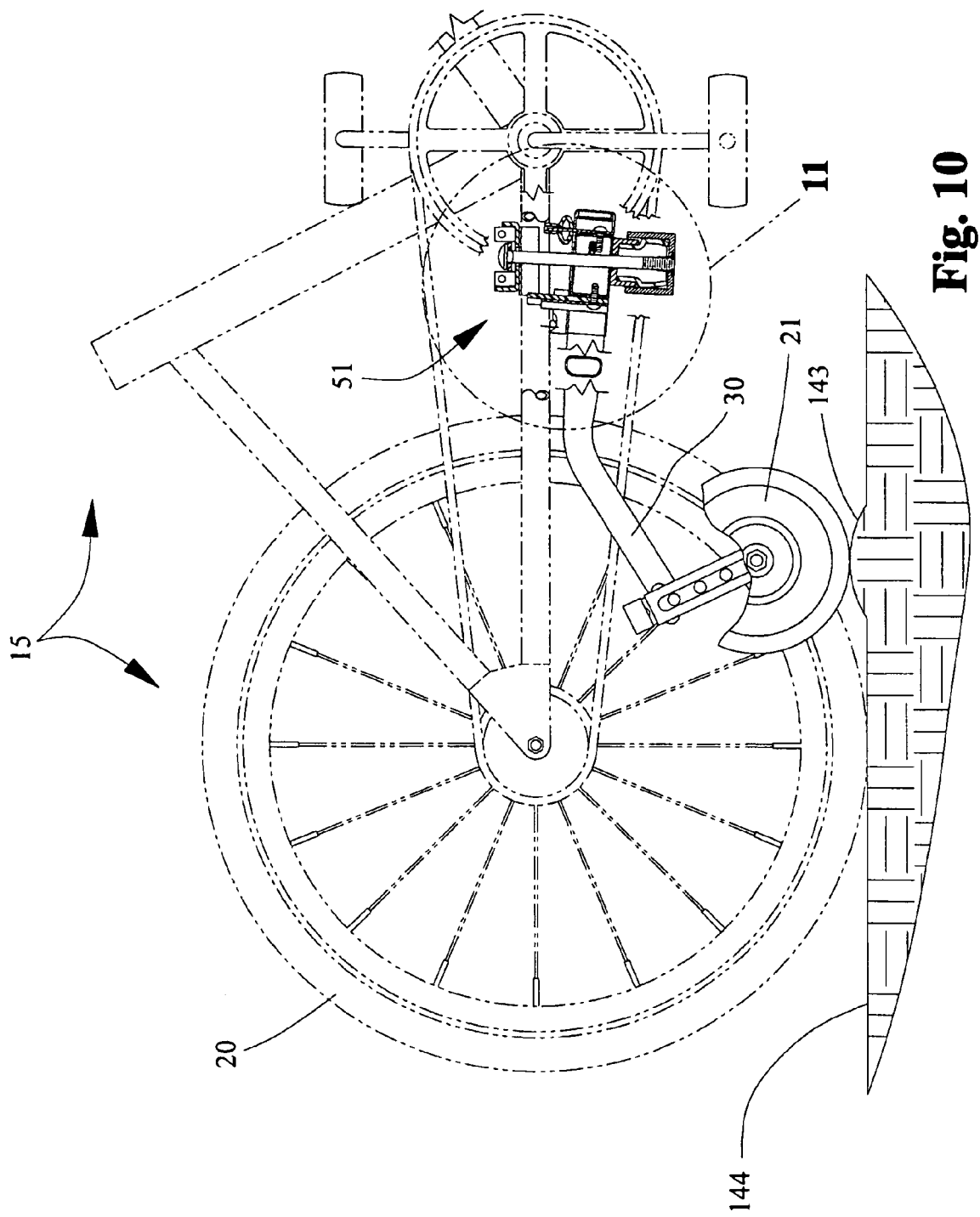
FIG. 10 is a fragmentary side elevational view similar to FIGS. 7 and 8 illustrating operation when the bicycle rear wheel encounters a bump.

FIG. 1 shows normal operation over a smooth surface 32. When a training wheel hits a bump 143 in an irregular surface 144 (FIG. 10) a training wheel 21 deflects upwardly as the training wheel leg 30 flexes, as enabled by dynamic compression fitting 51. Similar shifts are experienced when the bike's rear wheel encounters an irregular surface 146 (FIG. 8). In the latter view the training wheel 21 makes firm contact with surface 146 even though the rear bike wheel drops into a depression 147.

Figure 15:
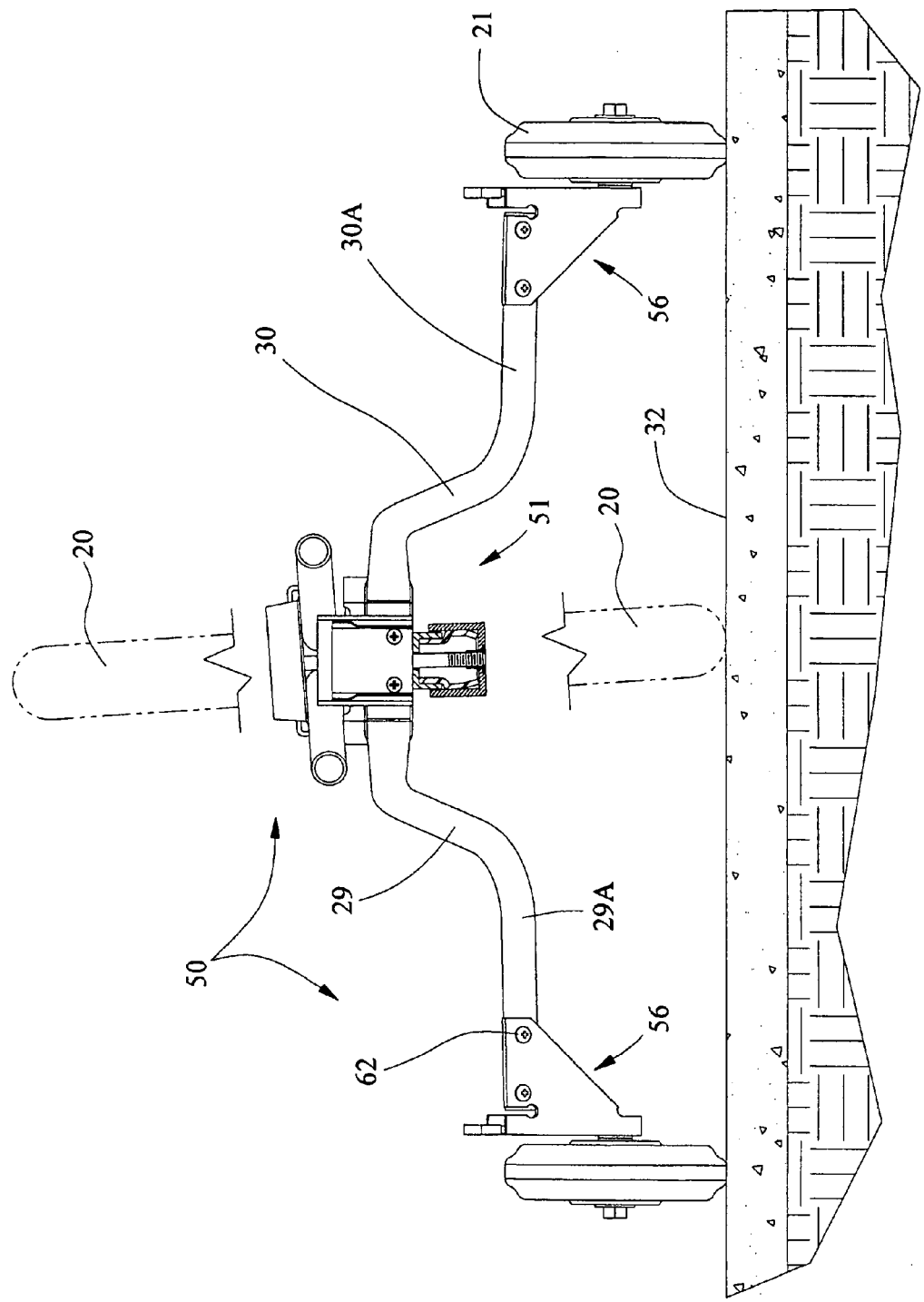
FIG. 15 is a fragmentary rear end elevation view of the training wheels on a level surface with the rider leaning into a turn, illustrating internal part movements with the bicycle rear wheel in contact with a level surface.
Figure 17:
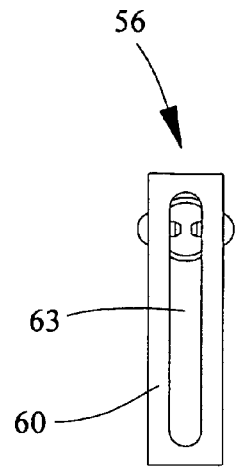
FIG. 17 is side elevational view of the bracket of FIG. 16, as viewed along line 17-17 of FIG. 16.
Figure 16:
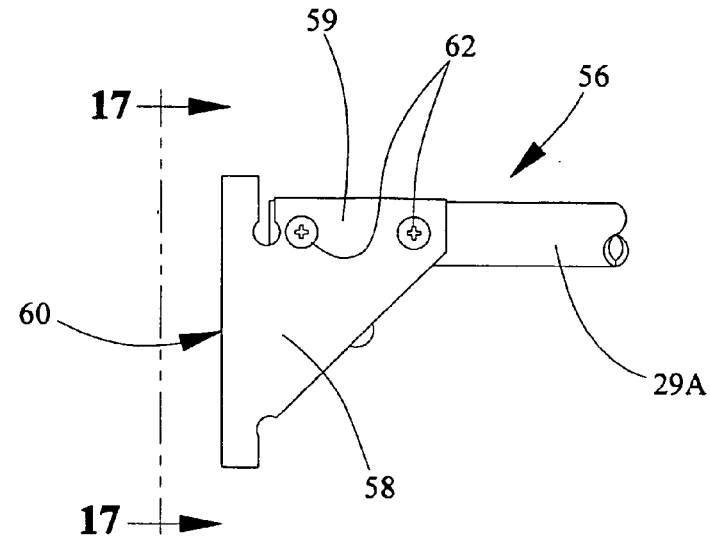
FIG. 16 rear elevational view of the left training wheel bracket of FIG. 5, set up for a standard diameter wheel.
Figure 19:
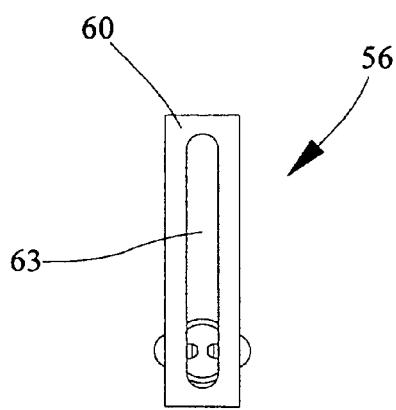
Figure 18:
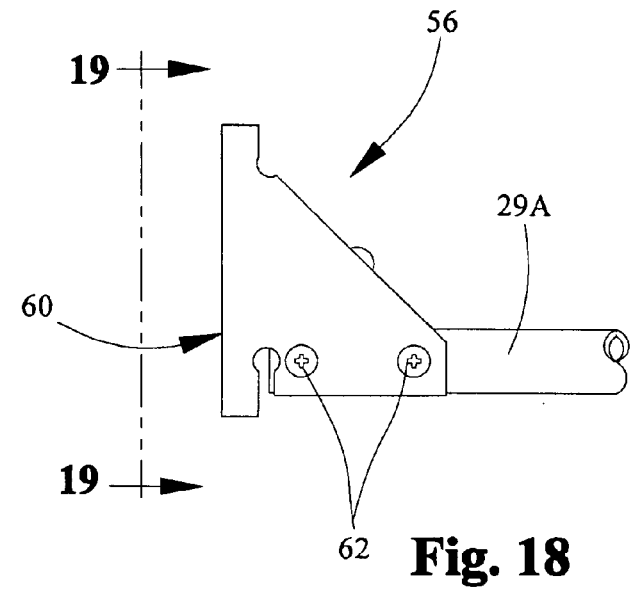
FIG. 18 is rear elevational view of left training wheel assembly bracket as in FIG. 5 as it appears when set up for use with larger diameter bicycle wheels; and, FIG. 19 is side elevation view of FIG. 18 as viewed along line 19-19 of FIG. 18.

During steering maneuvers, the bike can be tilted as in FIG. 15. In this drawing training wheel leg 29 has angularly risen relative to opposite leg 30, enabled by the dynamic compression fitting 51 that establishes a first pivot point enabling up and down training wheel motion, and another pivot point allowing the training wheels and their support legs to rotate in an arc spaced above and parallel with ground. The latter pivoting establishes or allows side to side motion. A rider over correcting the imbalance could tilt the bike toward the opposite direction and cause it to topple over with conventional training wheel mounting systems. With the present design there is less distance between the surface 32 (FIG. 15) and the training wheels 21; in other words, the wheel offset is reduced and the wheel support legs 29, 30 effectively compensate for the shock.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A training wheel assembly adapted to be mounted upon a conventional bicycle for stabilizing it, the bicycle comprising a pedal-driven crank, a sleeve for the crank, a rear wheel, a pair of side frame tubes extending from the crank sleeve to the rear wheel, and a generally trapezoidal void defined between the side frame tubes proximate the crank sleeve, the assembly comprising:
   a pair of spaced apart training wheels adapted to be disposed on opposite sides of the bicycle adjacent said rear wheel;
   a pair of rearwardly projecting, offset training wheel support legs for mounting the wheels; and,
   a dynamic compression fitting for flexibly mounting the training wheel legs, the compression fitting mounted within said void region, the compression fitting comprising:
      an adjustable mounting flange section secured proximate said void region upon said bicycle side frame tubes;
      an intermediate flexing section resiliently coupled to and disposed immediately beneath said flange section for receiving the training wheel legs and establishing a first pivot;
      a damper section disposed beneath said intermediate flexing section; and,
      an elongated through bolt that generally coaxially penetrates said flange section, said flexing section, and said damper section for axially compressing said sections together, said bolt establishing a second pivot point.

2. The training wheel assembly as defined in claim 1 wherein said training wheel support legs are L-shaped, and the support legs comprise rear portions projecting generally perpendicularly outwardly away from a plane occupied by said rear wheel.

3. The training wheel assembly as defined in claim 2 further comprising adjustable brackets adapted to be secured to said training wheel support legs for adjustably positioning the training wheels.

4. The training wheel assembly as defined in claim 3 wherein said brackets are reversible, and comprise elongated mounting slots for variably positioning said wheels.

5. The training wheel assembly as defined in claim 3 wherein said training wheel support legs extend beneath and away from the crank sleeve to position them out of the way to reduce chances of rider injury.

6. The training wheel assembly as defined in claim 1 wherein said flange section comprises a yoke adapted to be adjustably positioned over said frame tubes.

7. The training wheel assembly as defined in claim 6 wherein said flange section yoke comprises a pair of generally L-shaped segments comprising downwardly projecting lips for contacting the frame tubes, and means for slidably adjusting the L-shaped segments towards or away from each other to custom fit and adjustably grasp the frame tubes beneath them.

8. The training wheel assembly as defined in claim 7 wherein said flange section means for slidably adjusting the L-shaped yoke segments comprise spaced-apart apertured tabs adapted to be squeezed together by adjustable bolts.

9. The training wheel assembly as defined in claim 6 wherein said flange section further comprises an internal, resilient cover extending across the frame tubes, the internal cover comprising outermost curved edges touching the outer circumference of both frame tubes, a flat plate overlying the cover to pressure it, and wherein said yoke sandwiches said plate against said cover.

10. The training wheel assembly as defined in claim 1 wherein said intermediate flexing section comprises a pair of generally squarish sockets for receiving said training wheel legs and preventing them from twisting.

11. The training wheel assembly as defined in claim 10 wherein said intermediate flexing section comprises a resilient side wall extending to the flange section above it to establish a pivot point enabling the training wheels to move upwardly and downwardly.

12. The training wheel assembly as defined in claim 11 wherein said intermediate flexing section comprises a rigid side wall and a resilient, compressible flex tube penetrated by said rigid wall to assist said resilient side wall.

13. The training wheel assembly as defined in claim 1 wherein said damper section comprises a rigid, tubular sleeve beneath said intermediate section, a tubular cap coaxially centered beneath said sleeve and telescopically displaceable relative to said sleeve, a resilient grommet compressively captivated between said sleeve and said cap, and wherein said through bolt coaxially penetrates said sleeve, said cap, and said grommet, and compressively axially telescopes said sleeve and said cap together.

14. A training wheel assembly adapted to be mounted upon a conventional bicycle for stabilizing it, the bicycle comprising a pedal-driven crank, a sleeve for the crank, a rear wheel, a pair of side frame tubes extending from the crank sleeve to the rear wheel, and a generally trapezoidal or void defined between the side frame tubes proximate the crank sleeve, the assembly comprising:
   spaced apart training wheels adapted to be disposed on opposite sides of the bicycle adjacent said rear wheel;
   rearwardly projecting, offset training wheel support legs for mounting the training wheels; and,
   a dynamic compression fitting for flexibly mounting the training wheel legs, the compression fitting mounted within said void region, the compression fitting comprising:
      an adjustable mounting flange section secured proximate said void region upon said bicycle side frame tubes;
      a damper section supported below said flange section comprising a rigid, tubular sleeve, a tubular cap coaxially centered beneath said sleeve and telescopically displaceable relative to said sleeve, a resilient grommet compressively captivated between said sleeve and said cap;
      an elongated through bolt that generally coaxially penetrates said flange section and said damper section for axially compressing said sections together, wherein said through bolt coaxially penetrates said sleeve, said cap, and said grommet, and compressively axially telescopes said sleeve and said cap together.

15. The training wheel assembly as defined in claim 14 wherein said training wheel support legs are L-shaped, and the support legs comprise rear portions projecting generally perpendicularly outwardly away from a plane occupied by said rear wheel.

16. The training wheel assembly as defined in claim 15 further comprising adjustable brackets adapted to be secured to said training wheel support legs for adjustably positioning the training wheels, wherein said brackets are reversible, and comprise elongated mounting slots for variably positioning said wheels.

17. The training wheel assembly as defined in claim 14 wherein said flange section comprises a yoke adapted to be adjustably positioned over said frame tubes, said yoke comprising a pair of segments contacting the frame tubes, and means for slidably adjusting the segments towards or away from each other to custom fit and adjustably grasp the frame tubes beneath them.

18. A training wheel assembly adapted to be mounted upon a conventional bicycle for stabilizing it, the bicycle comprising a pedal-driven crank, a sleeve for the crank, a rear wheel, a pair of side frame tubes extending from the crank sleeve to the rear wheel, and a generally trapezoidal or void defined between the side frame tubes proximate the crank sleeve, the assembly comprising:

spaced apart training wheels adapted to be disposed on opposite sides of the bicycle adjacent said rear wheel;

rearwardly projecting, offset training wheel support legs for mounting the training wheels; and, a dynamic compression fitting for flexibly mounting the training wheel legs, the compression fitting mounted within said void region, the compression fitting comprising:

an adjustable mounting flange section secured proximate said void region upon said bicycle side frame tubes;

an intermediate flexing section for securing said training wheel legs, the flexing section comprising resilient wall means extending to the flange section above it for establishing a pivot point enabling the training wheels to move upwardly and downwardly; and a damper section supported below said flange section comprising resilient means compressively captivated therewithin for establishing dampening; and, an elongated through bolt that generally coaxially penetrates said flange section, said flexing section and said damper section for axially compressing said sections together, wherein said through bolt establishes a pivot enabling said training wheel legs and the training wheels to move defining an arc parallel with and spaced above ground.

19. The training wheel assembly as defined in claim 18 wherein said flange section comprises a yoke adapted to be adjustably positioned over said frame tubes, said yoke comprising a pair of segments contacting the frame tubes, and apertured tab means for slidably adjusting the segments towards or away from each other.

20. The training wheel assembly as defined in claim 18 wherein:

said damper section comprises a rigid, tubular sleeve beneath said intermediate section;

a tubular cap is coaxially centered beneath said sleeve and telescopically displaceable relative to said sleeve;

said resilient means comprises a grommet compressively captivated between said sleeve and said cap; and, wherein said through bolt coaxially penetrates said sleeve, said cap, and said grommet, and compressively axially telescopes said sleeve and said cap together.

\* \* \* \* \*